United States Patent
Tanno et al.

(10) Patent No.: US 10,766,317 B2
(45) Date of Patent: Sep. 8, 2020

(54) PNEUMATIC TIRE

(71) Applicant: The Yokohama Rubber Co., LTD., Minato-ku, Tokyo (JP)

(72) Inventors: Atsushi Tanno, Hiratsuka (JP); Hayato Sakamoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 280 days.

(21) Appl. No.: 15/102,188

(22) PCT Filed: Dec. 3, 2014

(86) PCT No.: PCT/JP2014/081940
§ 371 (c)(1),
(2) Date: Jun. 6, 2016

(87) PCT Pub. No.: WO2015/083726
PCT Pub. Date: Jun. 11, 2015

(65) Prior Publication Data
US 2016/0311274 A1    Oct. 27, 2016

(30) Foreign Application Priority Data

Dec. 6, 2013    (JP) .................. 2013-253115

(51) Int. Cl.
*B60C 23/04*    (2006.01)
*B60C 23/20*    (2006.01)
(Continued)

(52) U.S. Cl.
CPC .......... *B60C 23/0493* (2013.01); *B60C 19/00* (2013.01); *B60C 23/20* (2013.01); *B60C 2019/004* (2013.01); *B60C 2200/065* (2013.01)

(58) Field of Classification Search
CPC ............. B60C 19/00; B60C 2019/004; B60C 2200/065; B60C 23/0493; B60C 23/20; B60C 13/001; B60C 23/10
(Continued)

(56) References Cited

U.S. PATENT DOCUMENTS 6,494,543 B1    12/2002    Hashimura et al.
2002/0174925 A1*    11/2002    Wilson .................. B60C 23/04
                                                                152/415
(Continued)

FOREIGN PATENT DOCUMENTS

JP    S59-089704    6/1984
JP    H05-091910    12/1993
(Continued)

OTHER PUBLICATIONS

WO2012160896A1—Machine Translation (Year: 2012).*
International Search Report for International Application No. PCT/JP2014/081940 dated Feb. 24, 2015, 4 pages, Japan.

*Primary Examiner* — Matthew J Daniels
*Assistant Examiner* — Yunju Kim
(74) *Attorney, Agent, or Firm* — Thorpe North & Western

(57) ABSTRACT

A pneumatic tire according to the present technology comprises at least one mechanical fastener member attached to a tire inner surface; and an outer surface mark provided on a tire outer surface, the outer surface mark showing a corresponding position in a tire rotation direction corresponding to the position where the mechanical fastener member is attached to the tire inner surface.

9 Claims, 3 Drawing Sheets

(51) Int. Cl.
*B60C 19/00* (2006.01)
*B60C 13/00* (2006.01)

(58) Field of Classification Search
USPC .......... 152/450, 209.1, 154.2, 415; 340/10.1
See application file for complete search history.

(56) References Cited

U.S. PATENT DOCUMENTS

| | | | |
|---|---|---|---|
| 2008/0246588 A1* | 10/2008 | Shimura | B60C 13/001 340/10.1 |
| 2012/0152420 A1* | 6/2012 | Larregain | B60C 11/00 152/209.1 |
| 2012/0298272 A1 | 11/2012 | Tanno et al. | |
| 2013/0292024 A1 | 11/2013 | Kawai et al. | |
| 2014/0144210 A1 | 5/2014 | Jyouza et al. | |

FOREIGN PATENT DOCUMENTS

| | | |
|---|---|---|
| JP | H05-093909 | 12/1993 |
| JP | H06-055915 | 3/1994 |
| JP | H06-0106917 | 4/1994 |
| JP | 2004-082775 | 3/2004 |
| JP | 2004-148953 | 5/2004 |
| JP | 2006-056443 | 3/2006 |
| JP | 2012-076649 | 4/2012 |
| JP | 2012-240465 | 12/2012 |
| JP | 2012-240602 | 12/2012 |
| JP | 2012-240603 | 12/2012 |
| WO | WO 2006/022218 | 3/2006 |
| WO | WO 2012/160896 | 11/2012 |

* cited by examiner

PNEUMATIC TIRE

TECHNICAL FIELD

The present technology relates to a pneumatic tire. The present technology particularly relates to a pneumatic tire with a mechanical fastener for attaching an object having specific function to the inner surface of the tire.

BACKGROUND ART

In recent years, research into disposing objects having various functions on the inner circumferential surface of a pneumatic tire has been conducted.

For example, a pneumatic tire has been proposed that includes one fastener among a pair of fasteners that can be separated into two in a region of a range from a bead tip to a maximum width position of a tire at a tire inner surface. An electronic circuit device with another fastener that is to be engaged with the one fastener is secured to the tire inner surface by engaging the two fasteners (Japanese Unexamined Patent Application Publication No. 2012-240602A).

In addition, technology has been proposed in which a mechanical fastener is provided on a tire inner surface to fix an object having special function to a specific position on the tire inner surface, the object being held so as not to rotate, and/or achieving great engagement force (Japanese Unexamined Patent Application Publication Nos. 2012-240603A and 2012-240465A).

In particular, it is important that pneumatic tires with a very large diameter in the scale of meters such as tires for construction vehicles (also known as off-the-road (OR) tires per industrial standards) are constantly monitored for tire internal air pressure. Consequently, such tires for construction vehicles are configured with a tire air pressure monitoring device disposed and fixed inside the tire, the tire air pressure monitoring device provided with tire internal air pressure detecting means and transmitting means configured to transmit the detection results.

One method of fixing may be such as that described in Japanese Unexamined Patent Application Publication No. 2012-240602A, in which one of a pair of mechanical fasteners provided fixed to the tire inner surface and a tire air pressure monitoring device provided with the other mechanical fastener are prepared, and the tire air pressure monitoring device is disposed and fixed on the tire inner surface by the engagement and the like of the mechanical fastener pair.

Typically, such a tire air pressure monitoring device is an electronic device provided with tire internal air pressure detecting means and transmitting means configured to transmit the detection results. As such, maintenance such as inspection and tuning is necessary.

Maintenance involving a large tire for construction vehicles with a diameter in the scale of meters is typically performed by removing the tire from the rim, then standing up the tire using an overhead crane, hoist, or the like.

However, problems exists such as, when the tire is stood up, it is impossible to know where the mechanical fastener is disposed on the tire inner surface just by looking from the outside, and depending on the installation position of the mechanical fastener in the state in which the tire is stood up, due to the large diameter of the tire the worker cannot perform work safely or even not at all on the vertically high side of the tire.

SUMMARY

The present technology provides a pneumatic tire provided with a mechanical fastener member on the inner surface of the pneumatic tire, wherein the installation position of the mechanical fastener member is easily knowable.

A pneumatic tire of the present technology has the configuration described in (1) below.

(1) A pneumatic tire, comprising:
at least one mechanical fastener member attached to a tire inner surface; and
an outer surface mark provided on a tire outer surface, the outer surface mark showing a corresponding position in a tire rotation direction corresponding to the position where the mechanical fastener member is attached to the tire inner surface.

Furthermore, a pneumatic tire of the present technology preferably has any of the following configurations (2) to (12).

(2) The pneumatic tire according to (1), further comprising an interior mark located on the mechanical fastener member attached to the tire inner surface or located on a periphery thereof, the interior mark showing the position of the mechanical fastener member.

(3) The pneumatic tire according to (1) or (2), wherein the position where the mechanical fastener member is attached to the tire inner surface is in a tread portion when viewed in a tire axial direction cross section.

(4) The pneumatic tire according to any one of (1) to (3), wherein the outer surface mark is provided at least at a tire shoulder portion.

(5) The pneumatic tire according to any one of (1) to (3), wherein the outer surface mark is provided at least on a tire side portion.

(6) The pneumatic tire according to any one of (1) to (3), wherein the outer surface mark is provided at a tire shoulder portion and on a tire side portion.

(7) The pneumatic tire according to (4) or (6), wherein the outer surface mark provided at the tire shoulder portion is provided at least on a groove bottom portion at the tire shoulder portion.

(8) The pneumatic tire according to (7), wherein a solid body portion surrounded by a ridge is provided at least on the groove bottom portion at the tire shoulder portion, and the outer surface mark is formed by coloring an inner portion of the solid body portion surrounded by the ridge.

(9) The pneumatic tire according to (8), wherein the solid body portion surrounded by the ridge is provided at the tire shoulder portion on a bottom portion of all of or a plurality of lateral grooves disposed around the entire tire circumference, and among these solid body portions, the outer surface mark is formed by selectively coloring the inner portion of the solid body portion disposed at a position where the outer surface mark is to be disposed.

(10) The pneumatic tire according to (8) or (9), wherein the inner portion of the solid body portion is at least partially colored to form the outer surface mark, the color differing from a color of the tire outer surface.

(11) The pneumatic tire according to any one of (1) to (10), wherein the pneumatic tire is a heavy duty tire, a tire for construction vehicles, or a tire for industrial vehicles.

(12) The pneumatic tire according to any one of (1) to (11), wherein an electronic circuit device including an air pressure sensor or a temperature sensor is fixed by the mechanical fastener member attached to the tire inner surface.

According to the present technology of (1), a pneumatic tire provided with a mechanical fastener member on the inner surface of the pneumatic tire, wherein the installation position of the mechanical fastener member is easily knowable, can be provided.

When the installation position of the mechanical fastener member is known, the tire can easily be put in an ideal position for carrying out required maintenance and then stood up or placed inclined in a specific direction as part of preparation for maintenance. As a result, maintenance such as inspection, tuning, replacement, and assembly, assembly, and the like can be performed more safely, more efficiently, and more precisely.

To explain the result in further detail, the laborious work of rotating the tire to a position at which maintenance can be easily performed on an object having specific function fixed to the tire inner surface by the mechanical fastener member can be made significantly more efficient, particularly in the case of large tires such as those for construction vehicles. In addition, the time-consuming work of visually searching for the object having specific function fixed by the mechanical fastener member in the dark due to light not reaching the tire inner surface can be made significantly more efficient, particularly in the case of large tires.

Specifically, in the case of a tire having a large outer diameter, upon maintenance or removal of the object having specific function fixed to the tire inner surface by the mechanical fastener member, or attachment of a new such object, the position in the tire rotation direction (tire circumferential direction) where the object is attached becomes easier to identify from the outside of the tire. In addition, in the case of a tire with a small diameter, the position where the object is attached (attaching position of the mechanical fastener member) can be identified from the outside of the tire. As a result, when the tire is removed from the rim, damage to the object or mechanical fastener member caused by the tire lever can be prevented.

According to the pneumatic tire of the present technology according to any of (2) to (12), it is possible to obtain the effect of the pneumatic tire of the present technology according to claim 1 more explicitly and to a greater detail.

DETAILED DESCRIPTION

A detailed explanation of the pneumatic tire of the present technology will be given below.

Figure 1:
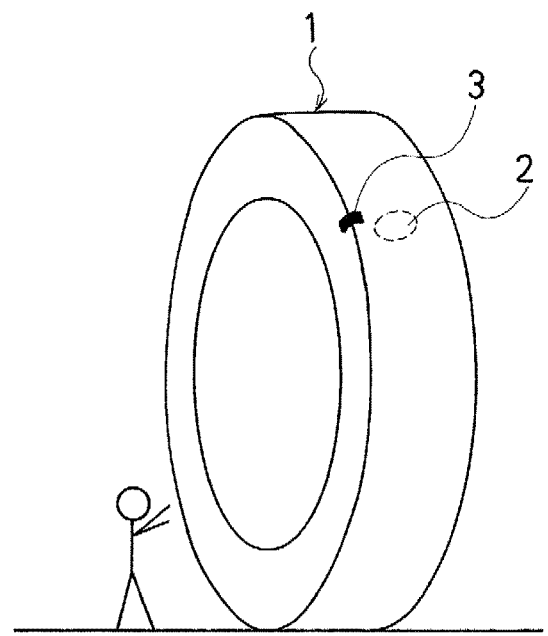
FIG. 1 is a perspective view schematically illustrating an embodiment of the pneumatic tire of the present technology.

As illustrated in FIG. 1, a pneumatic tire 1 of the present technology includes at least one mechanical fastener member 2 attached to a tire inner surface, and an outer surface mark 3 provided on a tire outer surface. The outer surface mark 3 shows the corresponding position in the tire rotation direction corresponding to the position where the mechanical fastener member 2 is attached on the tire inner surface.

As a result of such a configuration, the laborious work of rotating the tire to a position at which maintenance can be easily performed on an object having specific function fixed to the tire inner surface by the mechanical fastener member can be made significantly more efficient, particularly in the case of large tires such as those for construction vehicles or industrial vehicles. In addition, the time-consuming work of visually searching for the object having specific function fixed by the mechanical fastener member in the dark due to light not reaching the tire inner surface can be made significantly more efficient, particularly in the case of these large tires.

Specifically, in the case of a tire having a large outer diameter, upon maintenance or removal of the object having specific function fixed to the tire inner surface by the mechanical fastener member, or attachment of a new such object, the position in the tire rotation direction (tire circumferential direction) where the object is attached becomes easier to identify from the outside of the tire. In addition, in the case of a tire with a small diameter, the position where the object is attached (attaching position of the mechanical fastener member) can be identified from the outside of the tire. As a result, when the tire is removed from the rim, damage to the object or mechanical fastener member caused by the tire lever can be prevented.

In the present technology, "mechanical fastener" is a mechanical fastener basically similar to that described in Patent Documents 1 to 3 described above, and refers to a pair of fastener members configured so that the pair of fastener members can be separated into two fastener members and can be physically re-engaged, and so that this engaging and separating can be freely repeated.

Exemplary types of such a mechanical fastener are those known as "hooks" or "snaps". Specific examples of products in the clothing industry that are generally included as mechanical fasteners are snap buttons, ring snaps, ring hooks, American snaps, American hooks, eyelet hooks, spring hooks, and jumper hooks. Such mechanical fasteners differ from surface fasteners in that while an area of the engaging part of a surface fastener is unlimited in the entire area, the area of the engaging part of a mechanical fastener is small (e.g. preferably from about 1 to 115 $mm^2$ and more preferably from about 4 to 90 $mm^2$). In other words mechanical fasteners are point fasteners. In other words, even when engaged at a small area of from about 1 to 115 $mm^2$ for example, due to a mechanical male-female structure or the like, strong engaging is achieved. Thus, a conventional structure for the mechanical fastener may be used. The mechanical fastener can be formed from materials such as metals, synthetic resins, hard rubbers, and the like.

Figure 2:
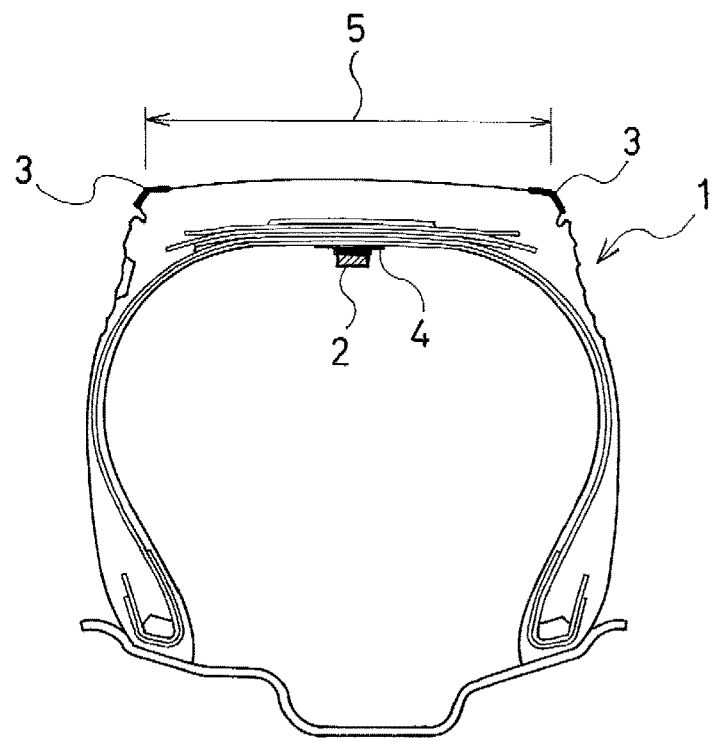
FIG. 2 is a tire meridian cross-sectional view schematically illustrating the embodiment of the pneumatic tire of the present technology.

In the present technology, a configuration including an interior mark that shows the attaching position of the mechanical fastener member provided on the surface or periphery of the mechanical fastener member attached to the tire inner surface is preferable. Visually searching the tire inner surface for the position of the mechanical fastener member can be effectively performed when an interior mark 4 is provided on the surface and/or the periphery of the mechanical fastener member on the tire inner surface due to the position being easily seen by simply looking at the tire inner surface. This embodiment is schematically illustrated in FIG. 2.

The interior mark 4 is preferably constituted at least partially by fluorescent coating material, glow in the dark coating material, luminous coating material, or light reflective material. Alternatively, the interior mark 4 may be colored a bright white color or like. The reflective material is preferably retroreflective material in which small beads are used in the reflective material.

In addition, the attaching position of the mechanical fastener member 2 attached to the tire inner surface is preferably in the tread portion 5 (in the tread portion on the tire inner surface, a position below the belt layers (on the tire rotational axis side)) when viewed in a tire axial direction cross section (tire meridian cross section). This is because when the mechanical fastener member 2 is disposed in the tread portion, though attaching the object to the mechanical fastener member and removing the object from the mechanical fastener member become difficult compared to when the mechanical fastener member 2 is disposed in a different place, the effect of the present technology is increased.

Figure 3:
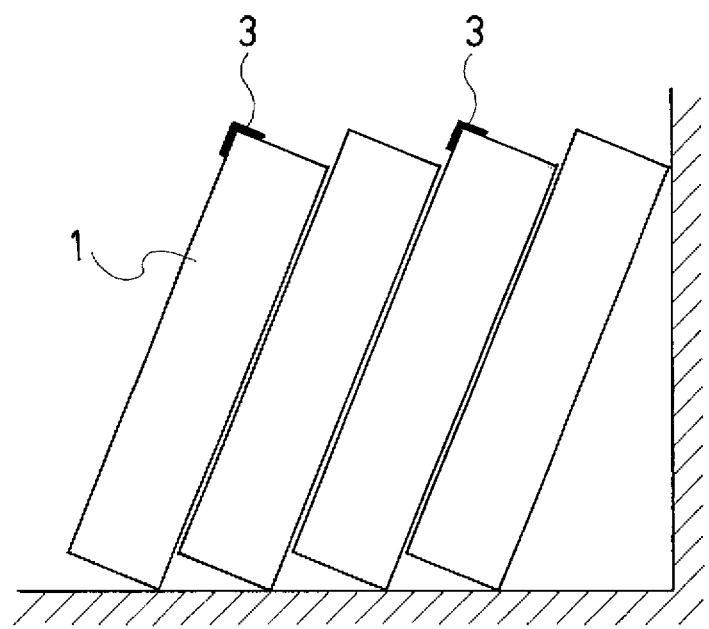
FIG. 3 is a view for explaining the embodiment of the pneumatic tire of the present technology and is side view schematically illustrating an example relationship between the storage state of the pneumatic tire and an outer surface mark showing a corresponding position in the tire rotation direction corresponding to the position where a mechanical fastener member is attached on a tire inner surface.

The outer surface mark 3 is preferably provided at least at the tire shoulder portion. In such a case, the outer surface mark 3 is more preferably provided at least on a groove bottom at the shoulder portion. The outer surface mark 3 is preferably provided at the tire shoulder portion because when large tires for construction vehicles and the like are stored, the tires are often stored stood at an incline as illustrated in FIG. 3. With the outer surface mark 3 provided at the tire shoulder portion, even in such a state the tires are easily visually distinguishable. The outer surface mark 3 is more preferably provided on the groove bottom because wear, fouling, cuts, and the like may leave the outer surface mark 3 indistinguishable when the outer surface mark 3 is provided only on a land portion of the shoulder portion. As such, it is preferable to provide the outer surface mark 3 on the groove bottom whereby distinguishability can be preserved over a long time period.

In addition, the outer surface mark 3 is preferably provided on a tire side portion for similar reasons in that it is easily visually distinguishable. This is because when a tire has a small tire size, an outer surface mark 3 on the tire side portion may be easier to visually identify.

For the reasons described above, an embodiment in which the outer surface mark 3 is provided on both the tire shoulder portion and the tire side portion is preferable.

In the present technology, "corresponding position in the tire rotation direction corresponding to the position where the mechanical fastener member is attached on the tire inner surface" refers to not only "the same position in the tire rotation direction" but also includes the notion of "a position defined by virtue of a specific correspondence relationship". For example, "position where the mechanical fastener member is attached to the tire inner surface" may mean it is suitable to provide the outer surface mark at an opposite position 180 degrees apart along the entire tire circumference. This is because work may be more favorable from the perspective of ease of work for the worker who carries out preparations such as those described above.

In the present technology, the method of forming the outer surface mark 3 may be a method of impressing, as well as a method of printing or coating. A method combining impressing, printing, and/or coating is also suitable.

In addition, the outer surface mark 3 is preferably at least partially colored a color different from that of the tire outer surface. The outer surface mark 3 is preferably shaped like a solid body portion surrounded by a ridge formed by the mold upon tire manufacture. The surrounded inner portion is preferably colored a color different from that of the tire outer surface by coating material or the like.

Specifically, for example, a detailed preferable form is one in which the solid body portion surrounded by the ridge (the surrounded inner portion is a recessed portion) is formed in the bottom portion of each of the grooves disposed in rows around the entire tire circumference. Among these solid body portions, only the inner portion surrounded by a ridge at the position where the outer surface mark is to be disposed is selectively colored by a specific coating material or the like.

Figure 4:
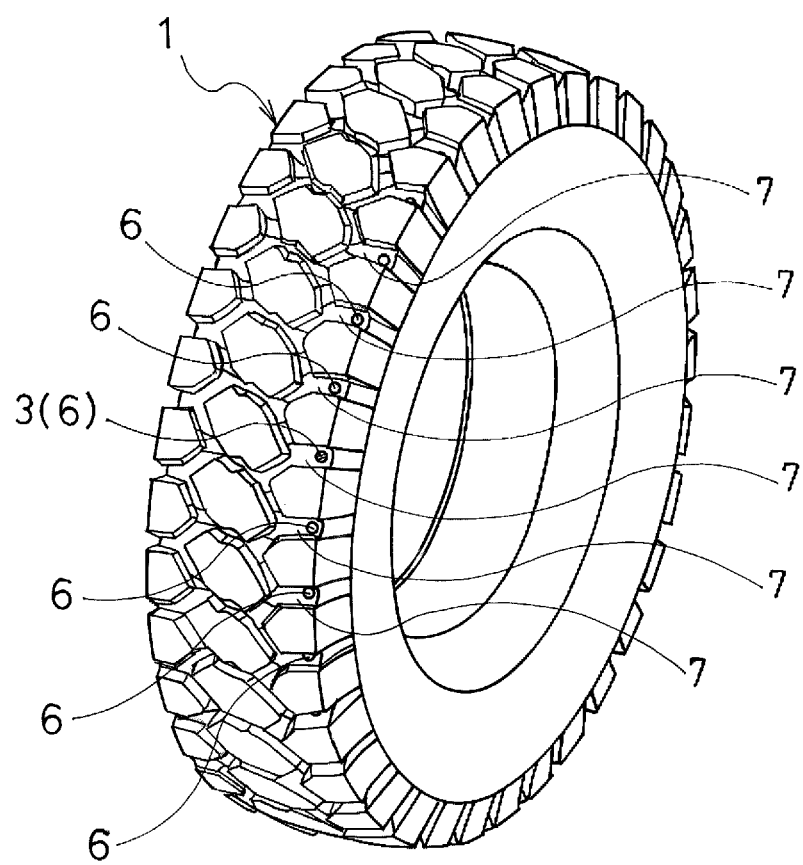
FIG. 4 is a perspective view for explaining another embodiment of the pneumatic tire of the present technology.

This preferable embodiment of a pneumatic tire is illustrated in FIG. 4. Solid body portions 6 surrounded by a ridge (the surrounded inner portion being formed as a recessed portion) are formed at the shoulder portion in the groove bottom of each lateral groove 7 disposed around the entire tire circumference. Among these solid body portions 6, the inner portion of the solid body portion disposed at the position where the outer surface mark is to be disposed is selectively colored by a specific coating material or the like, thus forming the outer surface mark 3.

An embodiment in which coloring the location surrounded by the ridge in such a manner is preferable because such an embodiment can prevent the applied color from fading due to rubbing when the tire is in service. As a result, the effect of the present technology can be exhibited over a long time period. In addition, pre-marking particularly using colored rubber may be applied to the position of the outer surface mark to be colored prior to tire vulcanization. In addition, a solid body portion which is a recessed portion may be formed at the shoulder portion in the groove bottom of each of the lateral grooves 7. Among these solid body portions, only the inner portion of the solid body portions disposed at the position where the outer surface mark is to be disposed is selectively colored by a specific coating material or the like, thus forming the outer surface mark 3.

Note that in the case that the solid body portions 6 for the outer surface mark cannot be disposed around the entire tire circumference, the solid body portions 6 for the outer surface mark may be disposed at positions forming divisions appropriately around the entire tire circumference. Even in the case that the precise position is not known, for convenience, a configuration in which the rough position is known can achieve the effect of the present technology. The number of divisions of the tire circumference is preferably from 8 to 24, both inclusive.

In addition, in the embodiments described above, the inner portion of the solid body portion described above is preferably at least partially colored to form the outer surface mark a color different from that of the tire outer surface.

In the present technology, the pneumatic tire is preferably a heavy duty tire or a tire for construction vehicles or industrial vehicles (also known as off-the-road (OR) tires per industrial standards). In particular, this is because significant effects are exhibits when the outer surface mark is provided on tires with a large outer diameter. The range of the outer diameter is preferably 1000 mm or greater, more preferably 1500 mm or greater, and most preferably 2500 mm or greater.

In addition, the object having specific function fixed by the mechanical fastener member that is attached to the tire inner surface is specifically determined according to the purpose for installation. However, the object is preferably an electronic circuit device including an air pressure sensor or a temperature sensor, for example. An electronic circuit device including such sensors undergoes routine maintenance and the device is required to be replaced as appropriate. As such, the effect of the present technology can be significantly displayed.

As there is the possibility of a plurality of such objects having specific function being installed on the tire inner surface, it is practical to dispose a plurality of mechanical fastener members that attach to the tire inner surface. Alternatively, even when in practice the number of objects having specific function used is one, it is practical to dispose a plurality of mechanical fastener members that attach to the tire inner surface so that the place of installation can be changed a number of times, or the place of installation can be selected as appropriate.

Working Example 1 and Comparative Example 1

As illustrated in FIG. 2, one mechanical fastener member 2 was disposed on the equator portion of the inner circumferential surface of the tread portion of a pneumatic tire for construction vehicles (tire outer diameter of 2700 mm) and vulcanization bonded by vulcanization molding of the tires (Working Example 1, Comparative Example 1).

The tire of Working Example 1 included an outer surface mark 3 on the groove bottom at both tire shoulder portions coated with coating material. The tire of Comparative Example 1 was not provided with an outer surface mark or anything in particular.

Attachment of an air pressure sensor with a mechanical fastener member to the opposing mechanical fastener member was performed, starting with the pneumatic tires being unmounted on a wheel. The time (sec) from start to when the attachment of the air pressure sensor was completed was measured for each tire and compared.

This was performed five times and the results were for Working Example 1 an average of 110 sec and for Comparative Example 1 an average of 380 sec.

The difference in the time taken can be attributed to in Working Example 1 of the present technology, when mounting the tire on the wheel for example, the mechanical fastener member can be brought to a position where the air pressure sensor can be easily attached by checking the outer surface mark 3 while mounting the tire. Whereas in Comparative Example 1, after the tire was mounted on the wheel, the position of the pneumatic tire needed to be shifted until in a position where the air pressure sensor can be easily attached. As a result, the tire of Comparative Example 1 required approximately 3.5 times the total work time (sec) of Working Example 1.

The invention claimed is:

1. A pneumatic tire, comprising:
    at least one mechanical fastener member attached to a tire inner surface at a position in a tread portion when viewed in a tire axial direction cross section;
    an outer surface mark provided on a tire outer surface, the outer surface mark showing a corresponding position in a tire rotation direction corresponding to the position where the mechanical fastener member is attached to the tire inner surface, wherein a solid body portion surrounded by a ridge is formed in a bottom portion of each of a plurality of grooves disposed in rows around the entire tire circumference and the outer surface mark is formed by selective coloration of an inner portion surrounded by the ridge only at the corresponding position where the outer surface mark is to be disposed; and
    an interior mark located on a periphery of the mechanical fastener member attached to the tire inner surface, the interior mark showing the position of the mechanical fastener member.

2. The pneumatic tire according to claim 1, wherein the outer surface mark is provided at the tire shoulder portion and on the tire side portion.

3. The pneumatic tire according to claim 1, wherein the outer surface mark is provided at the tire shoulder portion and is provided at least on a groove bottom portion at the tire shoulder portion.

4. The pneumatic tire according to claim 3, wherein a solid body portion surrounded by a ridge is provided at least on the groove bottom portion at the tire shoulder portion, and the outer surface mark is formed by coloring an inner portion of the solid body portion surrounded by the ridge.

5. The pneumatic tire according to claim 4, wherein the solid body portion surrounded by the ridge is provided at the tire shoulder portion on a bottom portion of all of or a plurality of lateral grooves disposed around an entire tire circumference, and among these solid body portions, the outer surface mark is formed by selectively coloring the inner portion of the solid body portion disposed at a position where the outer surface mark is to be disposed.

6. The pneumatic tire according to claim 4, wherein the inner portion of the solid body portion is at least partially colored to form the outer surface mark, the color differing from a color of the tire outer surface.

7. The pneumatic tire according to claim 1, wherein the pneumatic tire is a heavy duty tire, a tire for construction vehicles, or a tire for industrial vehicles.

8. The pneumatic tire according to claim 1, wherein an electronic circuit device including an air pressure sensor or a temperature sensor is fixed by the mechanical fastener member attached to the tire inner surface.

9. The pneumatic tire according to claim 1, wherein the selective coloration comprises a colored rubber formed with the pneumatic tire prior to vulcanization.

* * * * *